(12) United States Patent
Lindner

(10) Patent No.: US 10,990,900 B2
(45) Date of Patent: Apr. 27, 2021

(54) SCHEDULING MACHINE LEARNING TASKS, AND APPLICATIONS THEREOF

(71) Applicant: VEDA Data Solutions, Inc., Washington, DC (US)

(72) Inventor: Robert Raymond Lindner, Fitchburg, WI (US)

(73) Assignee: Veda Data Solutions, Inc., Washington, DC (US)

( * ) Notice: Subject to any disclaimer, the term of this patent is extended or adjusted under 35 U.S.C. 154(b) by 581 days.

(21) Appl. No.: 15/948,652

(22) Filed: Apr. 9, 2018

(65) Prior Publication Data

US 2019/0311300 A1    Oct. 10, 2019

(51) Int. Cl.
| | |
|---|---|
| *G06F 3/00* | (2006.01) |
| *G06N 20/00* | (2019.01) |
| *G06F 9/54* | (2006.01) |
| *G06F 9/48* | (2006.01) |
| *G06F 16/24* | (2019.01) |

(52) U.S. Cl.
CPC ........... *G06N 20/00* (2019.01); *G06F 9/4881* (2013.01); *G06F 9/547* (2013.01); *G06F 16/24* (2019.01)

(58) Field of Classification Search
CPC ....................................................... G06F 9/546
USPC ......................................................... 719/314
See application file for complete search history.

(56) References Cited

U.S. PATENT DOCUMENTS

| | | | |
|---|---|---|---|
| 2006/0007474 A1* | 1/2006 | Daos ..................... | G06F 3/1285 358/1.15 |
| 2016/0292374 A1* | 10/2016 | Hutchins ................ | G16H 50/30 |

OTHER PUBLICATIONS

Kristina Lerman, Using a Model of Social Dynamics to Predict Popularity of News. (Year: 2010).*

* cited by examiner

*Primary Examiner* — Lechi Truong
(74) *Attorney, Agent, or Firm* — Sterne, Kessler, Goldstein & Fox P.L.L.C.

(57) ABSTRACT

To train models, training data is needed. As personal data changes over time, the training data can get stale, obviating its usefulness in training the model. Embodiments deal with this by developing a database with a running log specifying how each person's data changes at the time. When data is ingested, it may not be normalized. To deal with this, embodiments clean the data to ensure the ingested data fields are normalized. Finally, the various tasks needed to train the model and solve for accuracy of personal data can quickly become cumbersome to a computing device. They can conflict with one another and compete inefficiently for computing resources, such as processor power and memory capacity. To deal with these issues, a scheduler is employed to queue the various tasks involved.

14 Claims, 11 Drawing Sheets

SCHEDULING MACHINE LEARNING TASKS, AND APPLICATIONS THEREOF

BACKGROUND

Field

This field is generally related to processing personal data.

Background

As technology advances, an ever increasing amount of personal data is becoming digitized, and as a result, more and more personal data is becoming lawfully accessible. The increased accessibility of personal data has spawned new industries focused on lawfully mining personal data.

A personal data record may include a number of properties. A data record representing an individual may include properties such as the name of the individual, his or her city, state, and ZIP code. In addition to demographic information, data records can include information about a person's behavior. Data records from different sources may comprise different properties. Systems exist for collecting information describing characteristics or behavior of separate individuals. Collecting such personal information has many applications, including in national security, law enforcement, marketing, healthcare and insurance.

In healthcare for example, a healthcare provider may have inconsistent personal information, such as address information, from a variety of data sources, including the national provider identifier registration, Drug Enforcement Administration (DEA) registration, public sources, like Internet websites such as a YELP review website, and proprietary sources, such as a health insurance companies claims information.

As records receive more updates from different sources, they also have a greater risk of inconsistency and errors associated with data entry. In these ways, data records all describing the same individual can be incongruous, inconsistent, and erroneous in their content. From these various sources, a single healthcare provider can have many addresses, perhaps as many as 200 addresses. The sources may disagree about what the right address is. Some healthcare providers have multiple correct addresses. For this reason, the fact that a provider may have a more recent address does not mean that older addresses are incorrect.

Some health and dental insurance companies have staff tasked with manually calling healthcare providers in an effort to determine their correct address. However, this manual updating is expensive because a healthcare provider's address information may change frequently. In addition to address information, similar issues are present with other demographic information relating to a healthcare provider, such as its phone number.

In addition, fraudulent claims are enormous problems in healthcare. By some estimates, fraudulent claims may steal in excess of $80 billion a year from government-run health insurance programs alone. The prevalence of fraud far outstrips law enforcement's and insurance company's resources to investigate it.

Data-directed algorithms, known as machine learning algorithms, are available to make predictions and conduct certain data analysis. Machine learning is a field of computer science that gives computers the ability to learn without being explicitly programmed. Within the field of data analytics, machine learning is a method used to devise complex models and algorithms can be used for prediction and estimation.

To develop such models, they first must be trained. Generally, the training involves inputting a set of parameters, called features, and known correct or incorrect values for the input features. After the model is trained, it may be applied to new features for which the appropriate solution is unknown. By applying the model in this way, the model predicts, or estimates, the solution for other cases that are unknown. These models may uncover hidden insights through learning from historical relationships and trends in the database. The quality of these machine learning models may depend on the quality and quantity of the underlying training data.

Systems and methods are needed to improve identification and forecasting of the correct personal information, such as a healthcare provider's demographic information and propensity for fraud, or a data source.

BRIEF SUMMARY

In an embodiment, a system schedules data ingestion and machine learning. The system includes a computing device, a database, a queue stored on the computing device, and a scheduler implemented on the computing device. The scheduler is configured to place a request to complete a job on the queue. The request includes instructions to complete at least one of a data ingestion task, a training task and a solving task. The system also includes three processes, each implemented on the computing device and monitoring the queue: a data ingestion process, a trainer process, and a solver process. When the queue includes a request to complete the data ingestion task, the data ingestion task retrieves data relating to a person from a data source and to store the retrieved data in the database. When the queue includes a request to complete the training task, the trainer task trains a model using the retrieved data in the database and an indication that a value for the particular property in the person's data was verified as accurate or inaccurate. The model is trained such that it can predict whether another person's value for the particular property is accurate. Finally, when the queue includes a request to complete the solving task, the solver process applies the model to predict whether the other person's value in the plurality of properties is accurate.

Method and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Machine learning algorithms can train models to predict accuracy of personal data. To train the models however, significant training data is needed. As personal data changes over time, the training data can get stale, obviating its usefulness in training the model. Embodiments deal with this by developing a database with a running log specifying how each person's data changes at the time. When information verifying the accuracy of the person's data becomes available to train the model, embodiments can retrieve information from that database to identify all the data available for that person as existed at the time the accuracy was verified. From this retrieved information, features can be determined. The determined features are used to train the model. In this way, embodiments avoid training data from going stale.

When data is ingested, it may not be normalized. For example, the same address may be listed differently in different records and data sources. The distinct representations make it difficult to link the records. The machine learning algorithms and models will operate more effectively if the same data is represented in the same manner. To deal with this, embodiments clean the data to ensure the ingested data fields are normalized.

The various tasks needed to train the model and solve for accuracy of personal data can quickly become cumbersome to a computing device. They can conflict with one another and compete inefficiently for computing resources, such as processor power and memory capacity. To deal with these issues, a scheduler is employed to queue the various tasks involved.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
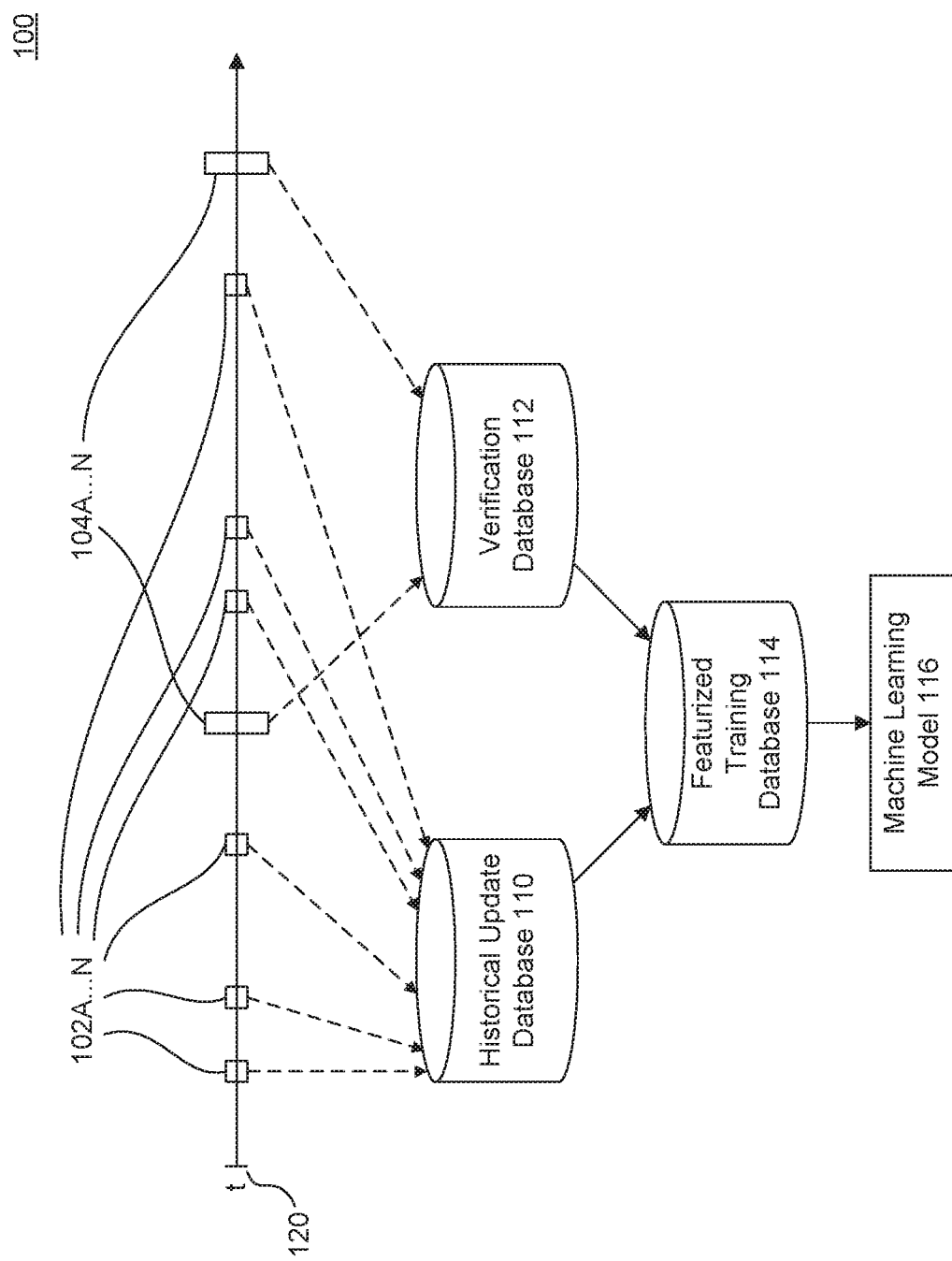
FIG. 1 is a diagram illustrating training in machine learning model with data that changes over time, according to an embodiment.

FIG. 1 is a diagram 100 illustrating training a machine learning model with data that changes over time, according to an embodiment. Diagram 100 includes a timeline 120. Timeline 120 illustrates times 102A . . . N and 104A . . . N.

At times 102A . . . N, information about a person or watched group of persons has been updated. The information may be stored in a plurality of different data sources as described below. Applied to healthcare providers, the data sources may include public databases and directories describing demographic information about the respective healthcare providers and proprietary databases, such as internal insurance directories and claims databases. An update to any of the data sources spurns a log of the change in historical update database 110. For example, when a new claim is added for a healthcare provider, the new claim is logged in historical update database 110. Similarly, when a provider's address is updated, the change is recorded in historical update database 110 such that historical update database 110 archives all the relevant data sources, for all the watched persons, at the time the change was made. In this way, historical update database 110 includes a running log specifying how the all relevant data relating to the watched persons has changed over time. From historical update database 110, the content of all the data stores as they were at any particular time can be determined.

At times 104A . . . N, at least some of the information is verified as being accurate or inaccurate. In the context of demographic information, such as an address or phone number, this may involve calling a healthcare provider and asking whether an address or phone number is valid. The result is an indication that the address is either valid or invalid and the time at which the verification occurred. Both of those values are stored in verification database 112. In addition to demographic information, other information about persons may be verified or determined, including their behavior. For example, times 104A . . . N may be the times in which a claim that had been determined, upon investigation, to be fraudulent occurred.

Using data and historical update database 110 and verification database 112, featurized training database 114 may be determined. Before entry into featurized training database 114, the historical data from historical update database 110 may be translated into features useful for training and machine learning algorithm as described below. These features are used to train a machine learning model 116.

If historical update database 110 only included the most recent information, the information in verification database 112 quickly becomes out of date as the information is updated at times 102A . . . N. In addition, verification at times 104A . . . N may occur independently of times 102A . . . N. If information from the data sources were collected only when verification data is received, time may have passed and data sources have been updated. For that reason, were historical update database 110 to only include data valid at the time new verification data is received, historical update database 110 would be out of date. For example, the data likely most relevant for predicting a fraudulent claim is the data that was valid at the time the claim was made. If historical update database 110 only included the most current information or the information available when a claim is determined to be fraudulent, much of the relevant historical data may be absent and consequent machine learning algorithms may be less effective.

Figure 2:
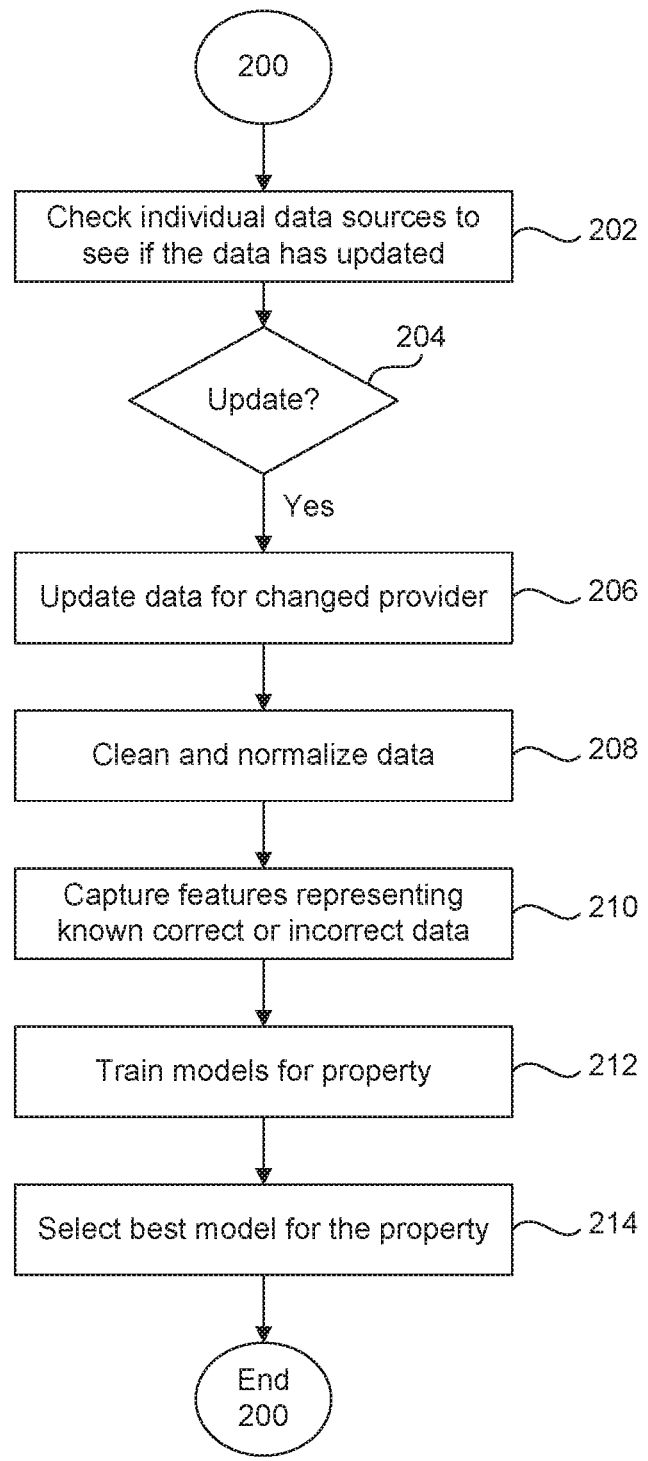
FIG. 2 is a flowchart illustrating a method of ingesting data and training a model, according to an embodiment.

FIG. 2 is a flowchart illustrating a method 200 of ingesting data to train a model, according to an embodiment. An example operation of method 200 is illustrated, for example, in diagram 300 in FIG. 3.

Method 200 begins at step 202 by checking individual data sources to determine whether data has been updated. To check whether data has been updated, embodiments may, for example, check a timestamp on the data, or determine a hash value for the data and compare the hash value to another hash value generated the last time the data was checked. The checking at step 202 may occur on a plurality of different data sources. These data sources are illustrated for example in diagram 300 in FIG. 3.

Diagram 300 illustrates various data sources: Center for Medicaid and Medicare (CMS) services data source 302A, directory data source 302B, DEA data source 302C, public data source 302D, NPI data source 302E, registration data source 302F, and claims data source 302G.

CMS data source 302A may be a data service provided by a government agency. The database may be distributed and different agencies organizations may be responsible for different data stored in CMS data source 302A. And CMS data source 302A may include data on healthcare providers, such as lawfully available demographic information and claims information. CMS data source 302A may also allow a provider to enroll and update its information in the Medicare Provider Enrollment System and to register and assist in the Medicare and Medicaid Electronic Health Records (EHR) incentive Programs.

Directory data source 302B may be a directory of healthcare providers. In one example, directory data source 302B may be a proprietary directory that matches healthcare providers with demographic and behavioral attributes that a particular client believes to be true. Directory data source 302B may, for example, belong to an insurance company and can only be accessed and utilized securely with the company's consent.

DEA data source 302C may be a registration database maintained by a government agency such as the DEA. The DEA may maintain a database of healthcare providers, including physicians, optometrists, pharmacists, dentists, or veterinarians, who are allowed to prescribe or dispense medication. The DEA data source 302C may match a healthcare provider with a DEA number. In addition, DEA data source to 302C may include demographic information about healthcare providers.

Public data source 302D may be a public data source, perhaps a web-based data source such as an online review system. One example is the YELP online review system. These data sources may include demographic information about healthcare providers, area of specialty, and behavioral information such as crowd sourced reviews.

NPI data source 302E is a data source matching a healthcare provider to a National Provider Identifier (NPI). The NPI is a Health insurance Portability and Accountability Act (HIPAA) Administrative Simplification Standard. The NPI is a unique identification number for covered health care providers. Covered health care providers and all health plans and health care clearinghouses must use the NPIs in the administrative and financial transactions adopted under HIPAA. The NPI is a 10-position, intelligence-free numeric identifier (10-digit number). This means that the numbers do not carry other information about healthcare providers, such as the state in which they live or their medical specialty. NPI data source 302E may also include demographic information about a healthcare provider.

Registration data source 302F may include state licensing information. For example, a healthcare provider, such as a physician, may need to register with a state licensing board. The state licensing board may provide registration data source 302F information about the healthcare provider, such as demographic information and areas of specialty, including board certifications.

Claims data source 302G may be a data source with insurance claims information. Like directory data source 302B, claims data source 302G may be a proprietary database. Insurance claims may specify information necessary for insurance reimbursement. For example, claims information may include information on the healthcare provider, the services performed, and perhaps the amount claimed. The services performed may be described using a standardized code system, such as ICD-9. The information on the healthcare provider could include demographic information.

Returning to FIG. 2, each of the data sources are evaluated to determine whether an update has occurred at decision block 204. If an update has occurred in any of the data sources, that update is stored at step 206. The update may be stored in historical update database 110 illustrated in FIG. 3. As described above with respect to FIG. 1, historical update database 110 includes a running log specifying how the person's data has changed over time.

Figure 3:
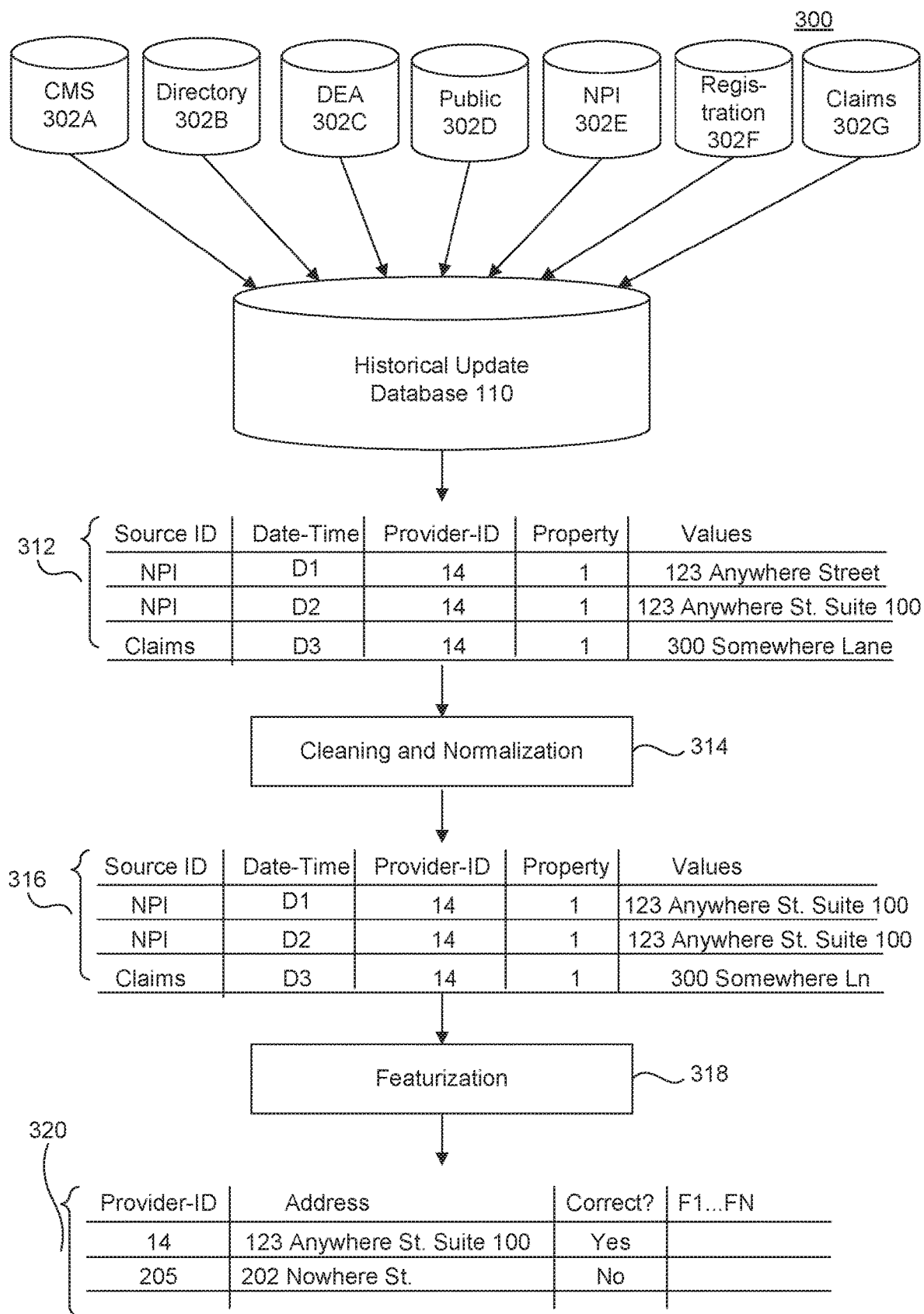
FIG. 3 is a diagram illustrating an example of ingesting data to train a model, according to an embodiment.

For example, in FIG. 3, such a running log in historical update database 110 is illustrated in table 312. Table 312 has three rows and five columns: a source ID, date time, provider-ID, property, and values. The source ID column indicates the source of the underlying data from historical update database 110. Tracking the source of the data may be important to ensure proprietary data is not used improperly. In table 312, the first two rows indicate that the data was retrieved from an NPI data source 302E and the third row indicates that the data was retrieved from a claims data source 302G. The date-time column may indicate the time of the update or the time that the update was detected. The provider-ID column may be a primary key identifier for a healthcare provider. The property column may be a primary key identifier for one of several watched properties, such as demographic data (e.g. address, phone number, name). In this case, each of the rows in table 312 have a property value of one, indicating that they relate to an update of an address property for the healthcare provider. The value column indicates the value received for that property from the particular source at the specified time and for the specified provider. In table 312, the first address value retrieved for the provider from NPI data source 302E is "123 Anywhere Street," the second address value later retrieved for the provider from NPI data source 302E is "123 Anywhere St. Suite 100."

After the raw data downloaded from the data sources is updated at step 206, data is cleaned and normalized at step 208. Sometimes different data sources use different conventions to represent the same underlying data. Moreover, some errors occur frequently in data. At step 210, these instances where different data sources use varying conventions to represent the same underlying data are identified. Moreover, some errors that occur frequently or regularly are corrected. This cleaning and normalization is described in greater detail below with respect to FIGS. 6-7.

Turning to FIG. 3, diagram 300 illustrates an example of cleaning and normalization at step 314 and table 316. In table 316, the first and second rows are determined to represent the same underlying attribute. Accordingly, they are linked by the given common representation. For consistency, "Street" is changed to the abbreviation "St." and a suite number missing from the first row is added.

Turning back to FIG. 2, features are captured representing known incorrect or correct data at step 210. As described above, the property for which a model is being built may be verified manually. For example, in the example of a model used to predict accuracy of a healthcare provider's address, a staff member can manually call the health care provider and ask whether or not an address is correct. That solution data may be used to train the model. In addition to the solution, the input parameters needed for the model must be determined. The input parameters may be called features.

Rather than inputting the raw data into the model, machine learning algorithms may operate better if the input parameters are facts related to the property. Facts may, for example, be true-false statements about the underlying raw data. For example, in an address model, the following features may be useful:

Was the address updated within the last six months? In the last year?

Does the provider have any state registrations that match this address?

Does claim data exist for this address in the last six months? In the last year?

Is the update date for the address data the same as the creation date?

New features may be constantly added and tested to determine their efficacy in predicting whether or not an address is correct. Features that have little effect may be removed in an effort to save computing resources and training and solving models. Meanwhile, new features that are determined to have predicted value may be added.

Turning to FIG. 3, this featurization process is illustrated at step 318 to produce training data illustrated at table 320. In table 320, two rows illustrate two different verifications that have occurred. For a provider with ID 14, the address "123 Anywhere St. Suite 100" has been verified as correct. For a provider with ID 205, an address "202 Nowhere St." has been verified as incorrect. Both rows have a set of features F1 . . . FN that has been determined for the respective address.

Returning to FIG. 2, the training data is used to train a plurality of machine learning models at step 212. Different types of models may have different effectiveness for each property. So at step 212, a number of different types of models are trained. The types can include, for example: logistic regression, naïve Bayes, elastic nets, neural networks, Bernoulli naïve Bayes, multimodal naïve Bayes, nearest neighbor classifiers, support vector machines. In some embodiments, these techniques can be combined. A trained model, on input of features relating to a property, may output a score indicating a likelihood that the property is correct.

At step 214, the best model or combination of models are selected. The best model may be the one that most accurately forecasts the property that it is trained to predict. Step 214 may be conducted using a grid search. For each of the known correct answers, features are calculated and applied to each of the trained models. For each of the trained models, an accuracy value is determined indicating the degree to which scores output by the trained model are correct. Then, the model with the greatest accuracy value is selected to forecast correctness of the property.

In this way, embodiments ingest data from the plurality of data sources and use that data to train a model able to predict whether a particular property is accurate. The trained model may be applied as illustrated in FIGS. 4 and 5.

Figure 4:
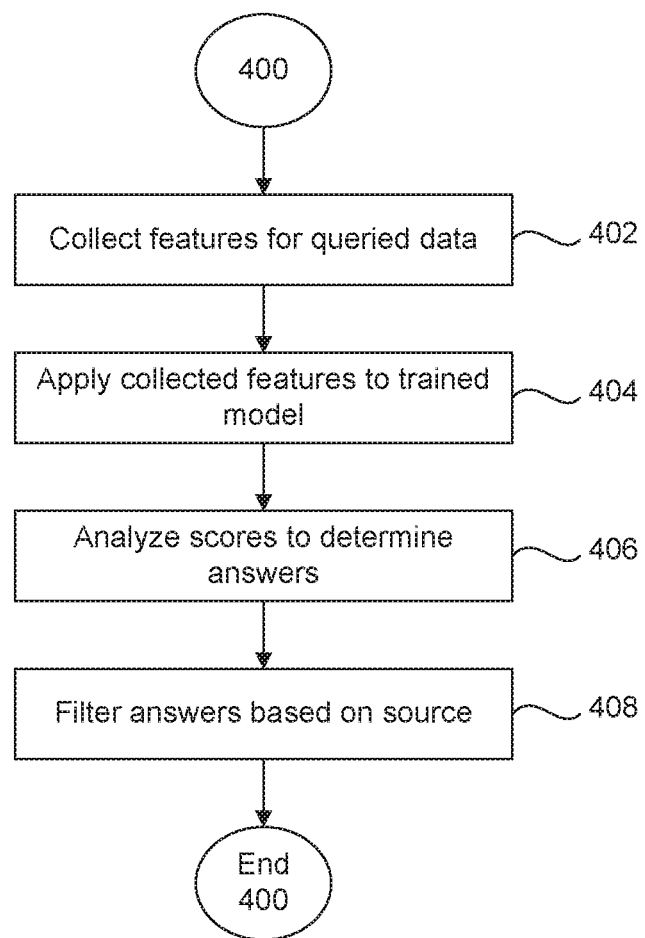
FIG. 4 is a flowchart illustrating a method of training a model, according to an embodiment.
Figure 5:
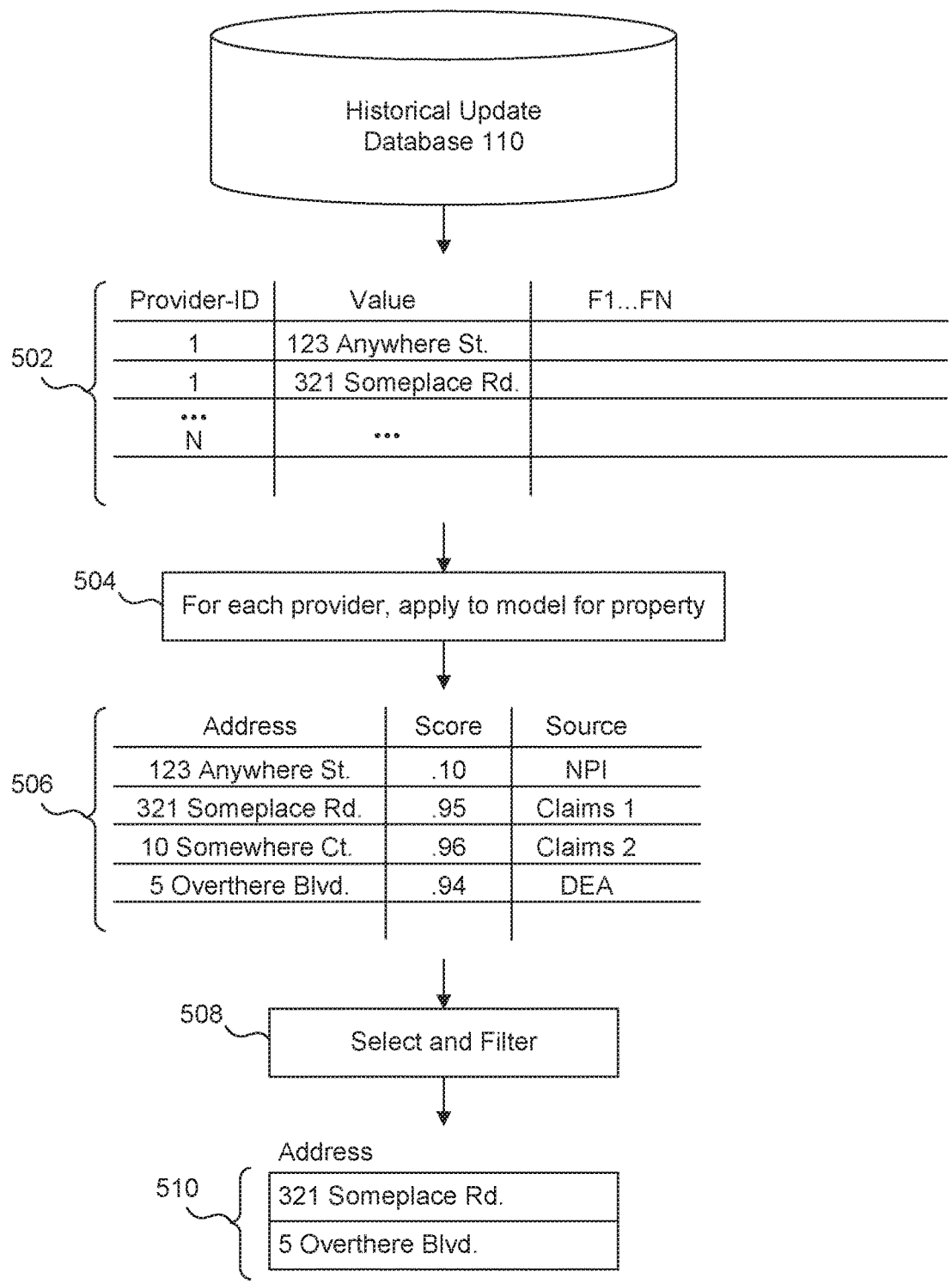
FIG. 5 is a diagram illustrating an example of applying a model to identify addresses, according to an embodiment.

FIG. 4 is a flowchart illustrating a method 400 of training a model, according to an embodiment. Operation of method 400 is illustrated in diagram 500 in FIG. 5.

Method 400 begins at step 402. At step 402, features are collected for the properties queried. The features may be collected the same way they are collected to develop training data for a model for the property. For example, the data may be cleaned and normalized just as it was for the training data as described above and detailed below with respect to FIGS. 6-7. The features may be calculated from the historical update database 110, using the most up-to-date information related to the property. In one embodiment, features may be calculated only for a provider requested by the user. In another embodiment, features may be calculated for every provider, or every provider that does not have a property (e.g., an address) that has been recently verified and included in the training data. An example of the calculated data is illustrated in diagram 500 in FIG. 5.

In diagram 500, table 502 illustrates data received from historical update database 110 for input into the training model. Each row represents a distinct value for the property predicted. The provider-ID corresponds to the provider for that value. F1 . . . FN are the features relevant to the provider and to the particular value. The features may be the same facts used to train the model.

Returning to FIG. 4, at step 404, the collected features are applied to the trained model. The features may be input to model, and consequently, the model may output a score indicating a likelihood that the value is accurate.

Example scores are illustrated in diagram 500 at step 504 and table 506. Table 506 represents the various possible addresses for a provider and the scores that a model has had output for each. In addition, table 506 includes the source of each address. To determine the source, an additional query to historical update database 110 may be necessary. In the example in table 506, four possible addresses exist for a particular provider: "123 Anywhere St." collected from an NPI data source, "321 Someplace Rd." collected from a first claims data source, "10 Somewhere Ct." collected from a second, different claims data source, and "5 Overthere Blvd." collected from a DEA data source. The model calculates a score for each.

In FIG. 4, the scores are analyzed to determine appropriate answers at step 406. For some properties, a provider can have more than one valid answer. For example, a provider may have more than one valid address. To determine which answers are valid, the scores may be analyzed. In one embodiment, scores greater than a threshold may be selected as correct. In another embodiment, scores lower than a threshold may be rejected as incorrect. In still another embodiment, a grouping of scores may be determined and the cluster of answers in that grouping may be selected as correct.

Once the possible answers are determined in step 406, they are filtered at step 408 based on the source of information. As described above, not all data sources are public. Some are proprietary. The filtering at step 408 may ensure that a value retrieved from a proprietary source is not disclosed to another party without appropriate consent.

The answer selection and filtering described in steps 406 and 408 are illustrated in FIG. 5 and step 508 and list 510. In this example, three of the four possible addresses may be selected as valid addresses for the provider: "321 Someplace Rd.," "10 Somewhere Ct.," and "5 Overthere Blvd." These three addresses have scores of 0.95, 0.96 and 0.94 respectively. These are close together and above a threshold, which may be 0.9. The remaining address, on the other hand, has a score of only 0.10, which is below the threshold and hence is rejected from possible solutions.

The three valid addresses are from three different data sources. The address "5 Overthere Blvd." was collected from a public data source, a DEA data source as described above. Having been collected from a public source, "5 Overthere Blvd." is included in list 510, which lists final answers to be presented to a user. The other two addresses—"321 Someplace Rd." and "10 Somewhere Ct." were collected from proprietary claims databases. In the example illustrated in diagram 500, the user may only have access to the first claims database containing the address "321 Someplace Rd.," but not the claims database containing the address "5 Overthere Blvd." Hence, "321 Someplace Rd." is included in list 510, but "5 Overthere Blvd." is not.

In this way, embodiments apply a trained model to solve for valid values for respective properties of personal data.

As described above, to both train the model and to apply collected data to the model to solve for the correct values, data ingested from the various data sources must be cleaned and normalized. This process is described, for example, with respect to FIG. 6-7.

Figure 6:
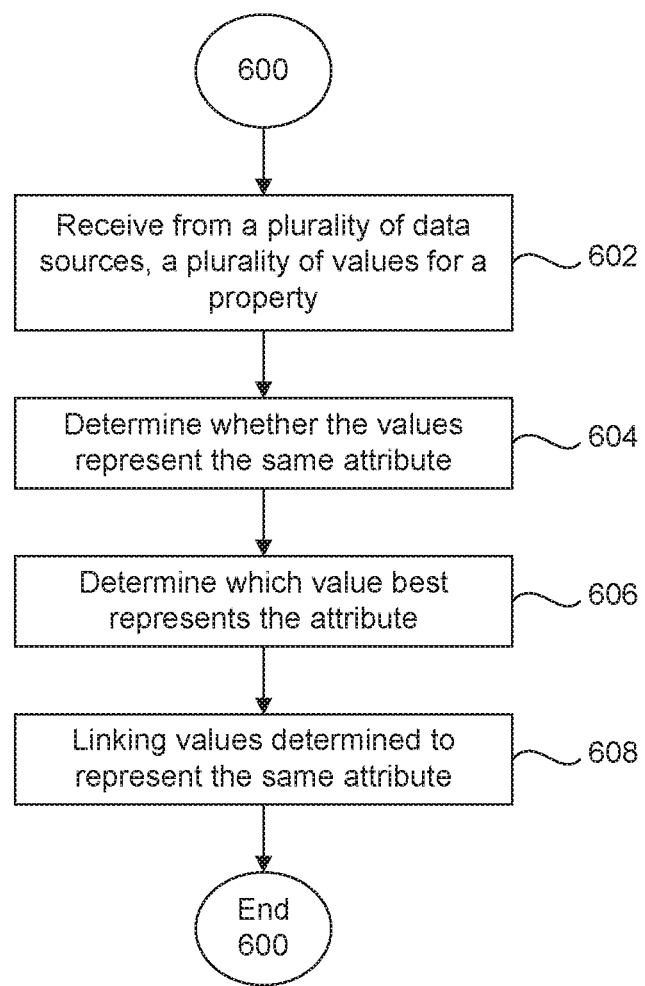
FIG. 6 is a diagram illustrating a method of cleaning ingested data, according to an embodiment.

FIG. 6 is a diagram illustrating a method 600 of cleaning ingested data, according to an embodiment.

Method 600 begins at step 602 when a plurality of values for properties is received from a plurality of data sources. This data ingestion process is described above with respect to FIGS. 2 and 3.

At step 604, the values are analyzed to determine whether any of them represent the same attribute. In the context of addresses, the various address values are analyzed to determine whether they are intended to represent the same underlying geographic location.

When multiple values are present to determine the same underlying attribute, step 606 and 608 occur. At step 606, the values are analyzed to determine which best represents the underlying attribute. In the context of addresses, the address that best represents the geographic location may be selected. In addition, any conventions, such as abbreviations or no abbreviations, may be applied to the addresses. In the context of entity names, step 606 may involve mapping various possible descriptions of the entity to a standard description consistent with a state registration. For example, "Dental Service Inc." (no comma) may be mapped to "Dental Service, Inc." (with a comma). In the context of claims, step 606 may involve mapping data to a common claim code system, such as ICD-9.

At step 608, the values are linked to indicate that they represent the same attribute. In one embodiment, they may be set to the same value determined in step 606.

Figure 7:
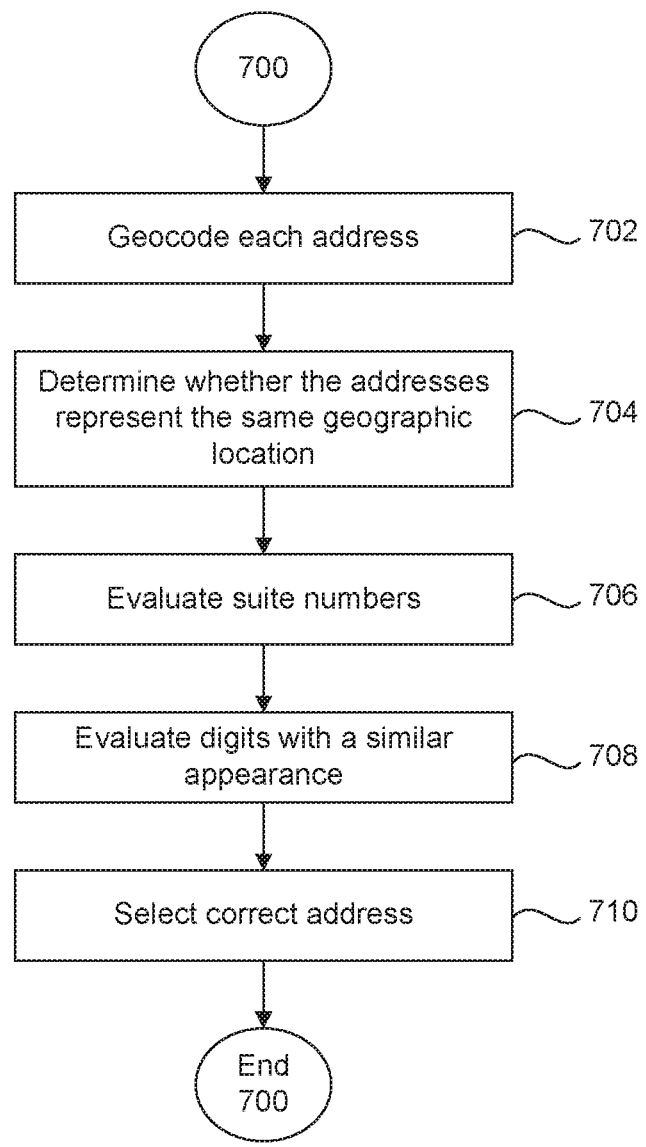
FIG. 7 is a diagram illustrating a method of cleaning ingested address data, according to an embodiment.

FIG. 7 is a diagram illustrating a method 700 of cleaning ingested address data, according to an embodiment.

Method 700 begins at step 702. At step 702, each address is geocoded. Geocoding is the process of transforming a postal address description to a location on the Earth's surface (e.g., spatial representation in numerical coordinates).

At step 704, the geocoded coordinates are evaluated to determine whether they represent the same geographic location. If they are, the ingested address values likely are intended to represent the same attribute.

At step 706, suite numbers are evaluated. Suite numbers are often represented in various ways. For example, instead of "Suite", other designations may be used. In addition, sometimes digits are omitted from suite numbers. Digits are more frequently omitted then incorrectly added. Using this, embodiments can select between multiple possible suite numbers.

For example, health care provider may have various addresses with different suite numbers: "Suite 550" and "Suite 5500." An embodiment determines whether a first string in the plurality of different values is a substring of a second string in another of the plurality of different values. For example, the embodiment determines that "550" is a substring of "5500." Then, the embodiment determines that "5500" more accurately represents the health care provider's address because digits are more often omitted then incorrectly added. In addition or alternative to checking for substrings, embodiments may apply fuzzy matching, e.g., comparing a Levenshtein distance between two strings with a threshold.

At step 708, digits with similar appearance are evaluated. In an embodiment, a first string in the plurality of different values is determined to be similar to a second string in another of the plurality of different values, except has a different digit with a similar appearance. When that determination occurs, the string that is determined to most accurately present the string is selected.

For example, a health care provider may have various addresses with different suite numbers: "Suite 6500" and "Suite 5500." The digits "5" and "6" may have a similar appearance. Other than the replacement of "6" with "5", the strings are similar. Thus, the strings may be identified as representing the same address. To determine which string is the correct suite number, other factors may be employed, such as the suite number as it is present in other sources.

Based on the analysis in steps 706 and 708, the correct address is selected in step 710.

Figure 8:
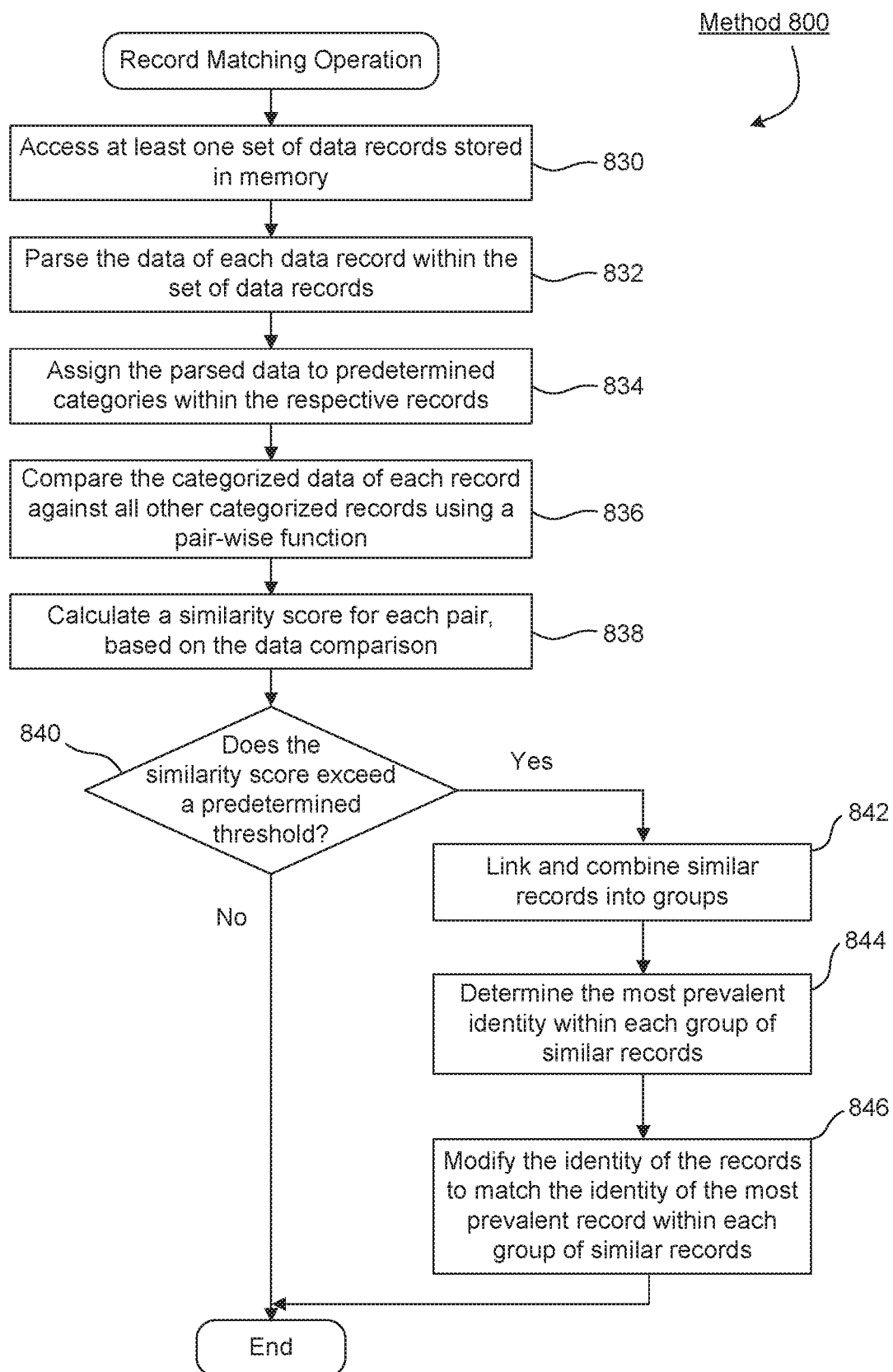
FIG. 8 is a diagram illustrating a method of linking ingested data, according to an embodiment.

FIG. 8 is a diagram illustrating a method of linking ingested data, according to an embodiment. As shown, method 800 describes an embodiment for matching and linking records using embodiments of the foregoing system. The term "matching" refers to determining that two or more personal data records correspond to the same individual.

At step 830, a processor lawfully accesses at least one set of data records stored in a memory. In an embodiment, the set of data records may include the data sources described above for FIGS. 2-3. All of the data is lawfully accessed and retrieved from the various external sources.

In some instances, the accessed data records may be received and/or stored in an undesirable format or in a format that is not compatible with the contemplated method and system. In such embodiments, the data record is cleaned or normalized to be consistent with a predetermined format.

At step 832, the data of each accessed record is parsed. In an embodiment, this parsing step is conducted using control logic that defines a set of dynamic rules. In an embodiment, the control logic may be trained to parse a data record and locate an individual's first name, last name, home address, email address, telephone number or any other demographic or personal information that describes an individual associated with the parsed data record. In an additional embodiment, the control logic may dictate a persistent set of rules based on the data record type being parsed.

At step 834, the parsed data is assigned to predetermined categories within the respective records. For example, an embodiment may include parsing rules for finding an individual's first name, last name, home address, email address, and phone number. In such an embodiment, as the processor finds the first name, last name, and so on, a temporary file may be created within the data record where the first name, last name, etc., are assigned to a corresponding category. In an additional embodiment, a new persistent file may be created to store the categorized data. For example, a new record may be created as a new row in a database table or memory and the different categories are each entered as a column value in the row. In yet another embodiment, the processor may assign the categorized data and store the assigned and categorized data as metadata within the original file.

At step 836, the categorized data of each record is compared against all other categorized records using a pair-wise function. For example, the processor compares the categorized data of a first record against the categorized data of a second record. In an embodiment, the processor compares a single category. For example, the processor compares the address associated with the first record against the address associated with the second record to determine whether they are the same. Alternatively, other possible categories may be compared, including first name, last name, email address, social security number, or any other identifying information. In an additional embodiment, the processor compares more than one category of data. For example, the processor may compare the first name, last name, and address associated with the first record against the first name, last name, and address of the second record to determine whether they are the same. The processor may track which categories match and which do not. Alternatively, the processor may merely count the number of categories that match. It is contemplated that step 836 may include comparing more than three categories. For example, in an embodiment the processor compares up to seven categories. In yet additional embodiments, the processor compares between eight and 20 categories.

In embodiments, step 836 may employ not just literal matching, but also other types of matching such as regular expression matching or fuzzy matching. Regular expression matching may determine that two values match when they both satisfy the same regular expression. Fuzzy matching may detect matches when two strings match a pattern approximately (rather than exactly).

In embodiments, step 836 may be conducted using multiple sets of data records. For example, data records from a first set of records may be compared against data records from a second set of records using the method and system described herein. In an embodiment, the first set of data records may be an input list including a data record describing a person of interest or a list of persons of interest. The second set of data records may be personal data records from a second input list or lawfully stored in a database. Comparing multiple sets of data records is performed to determine whether a record of the first set of data records and record of the second set of data records describe the same individual.

Further, in embodiments conducted using multiple sets of data records, the second set of data records may hold ground-truth identities, identities having a confirmed accuracy, and/or identities exceeding a predetermined accuracy threshold. The ground-truth identities may be encoded as a serial number.

At step 838, a similarity score is calculated for each data pair based on the data comparison. More specifically, the processor calculates a similarity score for each data pair based on which categories in the pair of records are determined to match in step 836. In an embodiment, the similarity score is calculated as a ratio. For example, in an embodiment where seven categories are compared, if the first and second records describe data such that five of the seven categories are the same between the records, the similarity score is 5/7.

In an additional embodiment, the similarity score is calculated as a percentage. For example, in an embodiment where 20 categories are compared, if the first and second records describe data such that 16 of the 20 categories are the same between the records, the similarity score is 0.8 or 80%.

In another embodiment, each category may be assigned a weight, and the similarity score may be determined in step 838 based on whether each category matches and the respective weights associated with the matching categories. The weights may be determined using a training set. In one example, the weights may be determined using linear programming. In other examples, neural networks or other adaptive learning algorithms may be used to determine a similarity score for a pair of data records based on which categories in the pair match.

At step 840, whether the calculated similarity score meets or exceeds a predetermined threshold is determined. For example, in an embodiment where the similarity score threshold is 5/7 (or approx. 71.4%), the processor will determine whether the calculated similarity score meets or exceeds the 5/7 threshold. Likewise, in an embodiment where the similarity score threshold is 16/20 (or 80%), the processor will determine whether the calculated score meets or exceeds the threshold.

At step 842, if the similarity score for at least two records meets or exceeds the similarity score threshold, the similar records (i.e., records that met or exceeded the similarity score threshold) are linked, or combined into a group. For example, in an embodiment, the processor performs a pair-wise comparison between a first record and all subsequent records. Any record meeting or exceeding the similarity score threshold is linked and/or combined in a first group. The processor then performs a pair-wise comparison between the second record and all subsequent records. Assuming the second record is not linked to the first record, any subsequent record meeting or exceeding the similarity score threshold (when compared to the second record) is linked and/or combined in a second group. When comparing multiple sets of data records, step 842 is also applicable. A similarity score is calculated for each data record of the first set of data records as they relate to data records of the second set of data records. As described above, any record meeting or exceeding the similarity score threshold is linked and/or combined in a group. In an embodiment, the linked/grouped records may be programmatically linked while the linked/grouped records remain in their respective set of records.

Further at step 842, a situation may arise where the pair-wise comparison between a first and second data record produces a similarity score that meets or exceeds the threshold value. Further, the pair-wise comparison between the second and a third record also produces a similarity score that meets or exceeds the threshold value, however, the pair-wise comparison between the first and third records were not similar and did not meet the threshold value. The processor may handle this conflicted grouping scenario in a number of ways. For example, in an embodiment, the processor may compare additional categories not included while performing the initial pair-wise comparison. For example, if the processor had compared first name, last name, address, and phone number during the initial comparison, during the second pair-wise comparison, the processor may include social security number, age, and/or any other information that may help narrow the identity. Following this second pair-wise comparison of the first, second, and third records, updated similarity scores are calculated for each comparison, (i.e., first-second, first-third, second-third) and the similarity scores are measured against a second predetermined threshold. If the updated similarity scores meet or exceed the second predetermined threshold, they are grouped according to the foregoing embodiments. If, however, the same situation persists, namely, the first-second records are similar, the second-third records are similar, but the first-third records are not, the second record will be grouped with either the first or third record depending on which pair-wise comparison has a higher updated similarity score. If the updated similarity scores are equal, another iteration of comparing additional columns begins.

In another embodiment, the processor may handle the conflicted grouping scenario by creating a copy of the second record. After making the copy, the processor may group the first and second records in a group A, and group the copy of the second record with the third record in a group B.

In yet another embodiment, the processor may handle the conflicted grouping scenario by creating a group based on the pair-wise comparisons of the second record. For example, based on the similarity scores between first-second and second-third records, all three records are grouped together based on their relationship to the second record.

At step 844, the processor determines the most prevalent identity within each group of similar records. For example, if the group of similar records contains 10 records and five of the records described an individual named James while the remaining five records included names such as Jim, Mike, or Harry, the processor would determine that James is the most prevalent name. In additional embodiments, the processor may require additional steps to determine the most prevalent identity within each group. For example, a situation may arise where a group of similar records contains six records, two describing an individual named Mike, two describing an individual named Michael, one describing an individual having the first initial "M", and the last record describing an individual named John. In such an embodiment, the processor may determine the most prevalent identity to be Michael, based on the relationship between the names Michael and Mike. In instances where there is no clear prevalent identity, additional categories (i.e., last name, address, email address, phone number, social security number, etc.) may be consulted to determine the most prevalent identity. In an embodiment where multiple sets of data records are compared, a data record of either the first or second set of data records may be modified or marked to indicate the most prevalent identity and/or the linked/grouped records. More specifically, the record may be modified such that a user may determine the most prevalent identities and/or linked data records upon reviewing a single set of data records.

At step 846, the processor modifies the identity of the similar records to match the identity of the most prevalent record within each group of similar records. We now relate back to the example provided above, where a group of similar records contained six records, two describing an individual named Mike, two describing an individual named Michael, one describing an individual having the first initial of "M", and the last record describing an individual named John. In this example, now at step 846, the processor modifies each of the records so the identity of each record describes an individual named "Michael". After the identity for each similar group has been modified, record matching operation is complete. This process is further illustrated in FIG. 9.

Figure 9:
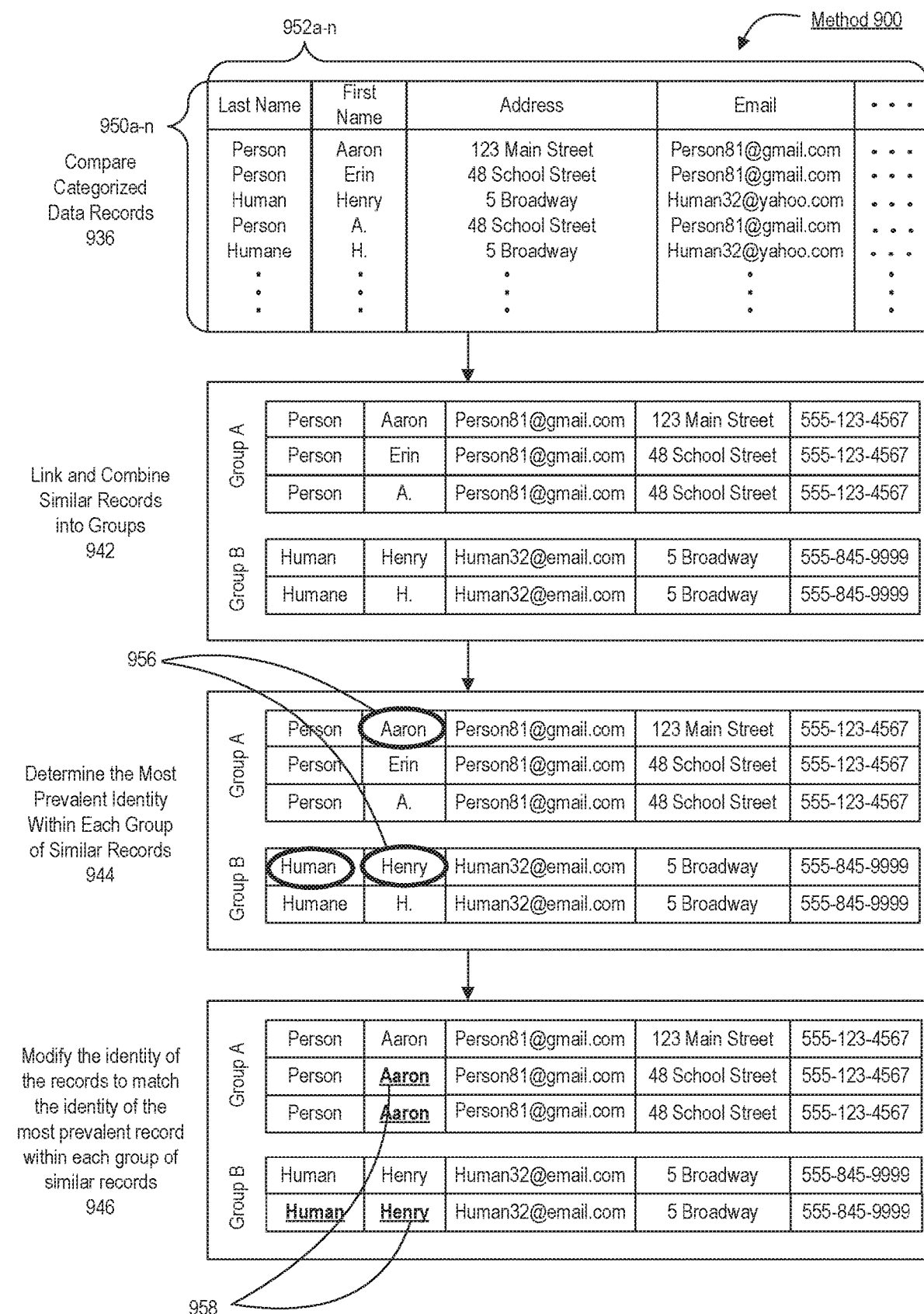
FIG. 9 is a diagram illustrating an example of linking ingested data, according to an embodiment.

FIG. 9 illustrates a flow diagram 900 illustrating an example operation, useful for implementing various embodiments of the present disclosure. As shown, diagram 900 illustrates an embodiment for a record matching operation, using embodiments of the foregoing system.

Diagram 900 illustrates data that has already been parsed, categorized, and normalized using either the parsing, assigning, and categorizing steps described above or using commonly known methods. As shown, the received categorized data has already been assigned to rows 950*a-n* and columns 952*a-n*. Each of rows 950*a-n* include information parsed from a data record that describes an individual. Each of columns 952*a-n* include categorized information that has been parsed and assigned to a predetermined category.

At step 936, a processor compares the categorized data of each record against all other categorized records using a pair-wise function. As described above, the processor may compare a single category, or alternatively, the processor may compare more than one category. In the embodiment shown, the processor compares five categories and enforces a similarity score threshold of 3/5 (or 60%).

Like above, the method depicted in FIG. 3 may also apply when comparing multiple sets of data records. For example, step 936 may also be performed using multiple sets of data records. Data records from a first set of records may be compared against data records from a second set of records. More specifically, the first set of data records may include a data record describing a person of interest or a list of persons of interest, while the second set of data records may be personal data records, lawfully stored in a database or memory.

At step 942, if the similarity score for at least two records meets or exceeds the similarity score threshold, the similar records (i.e., records that met or exceeded the similarity score threshold) are linked or combined into a group. As shown, based on the data provided in rows 950*a-n* and columns 952*a-n*, Groups A and B have been created. The number of possible groups is directly proportional to the number of rows being compared. As shown, Group A contains three records while Group B contains two records. Each record within the respective groups has met or exceeded the similarity score threshold ratio of 3/5 (or 60%) as compared to the other records within the group.

At step 944, the processor determines the most prevalent identity within each group of similar records. For example, in Group A, the processor compares the identities of "Aaron Person," "Erin Person," and "A. Person." Following the rules described above, the processor determines that "Aaron Person" is the most prevalent identity in Group A. In Group B, the processor compares the identities of "Henry Human" and "H. Humane." Also following the rules described above, the processor determines that "Henry Human" is the most prevalent identity in Group B.

At step 946, the processor modifies the identity of records 958 to match the identity of the most prevalent record within the respective groups of similar records. As shown, the records of Group A have been modified to describe the identity of "Aaron Person," while the records of Group B have been modified to describe the identity of "Henry Human."

Figure 10:
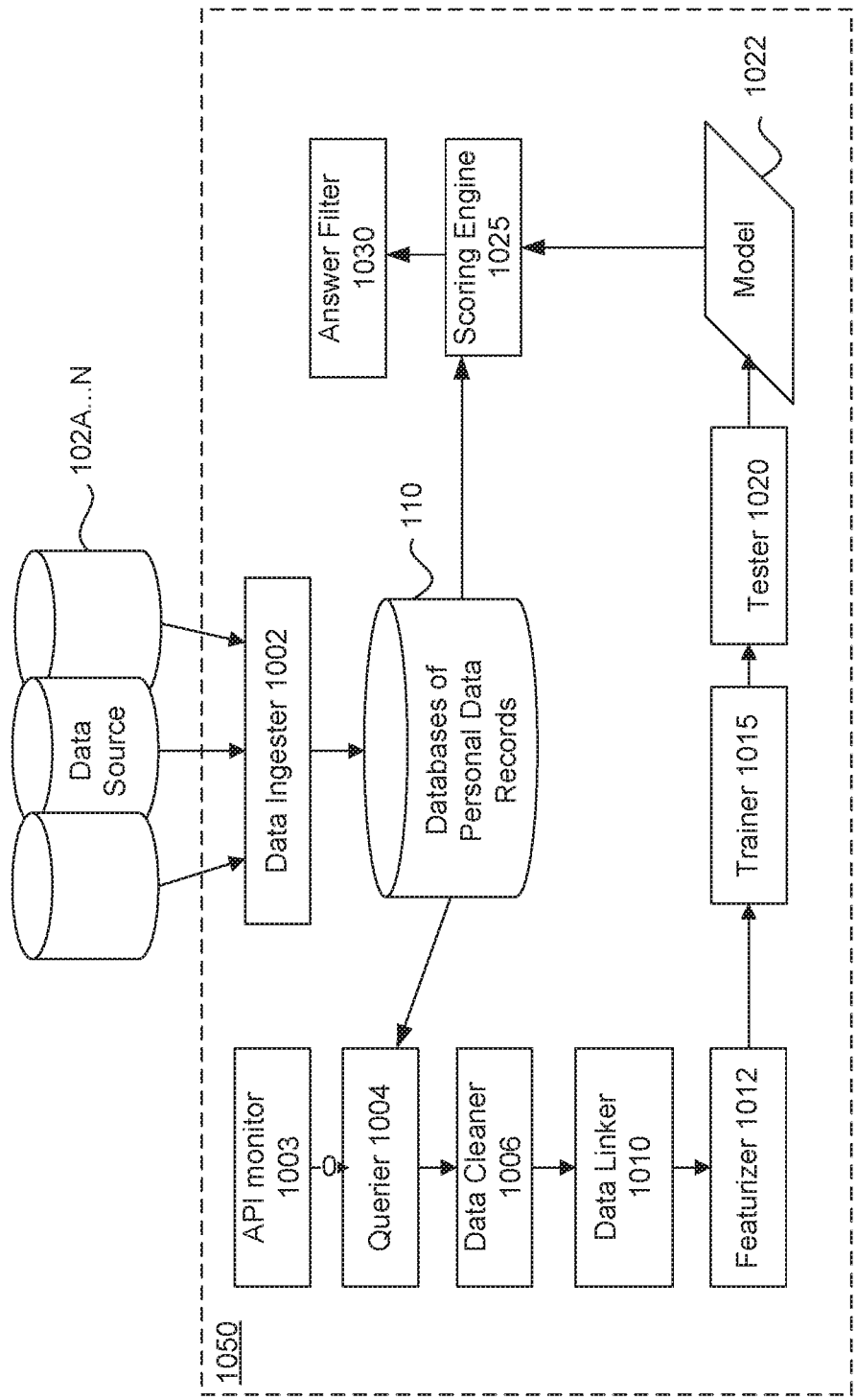
FIG. 10 is a diagram illustrating a system for ingesting data, training a model based on that data, and determining solutions based on the trained model, according to an embodiment.

FIG. 10 is a diagram illustrating a system 1000 for ingesting data, training a model based on that data, and determining solutions based on the trained model, according to an embodiment.

System 1000 includes a server 1050. Server 1050 includes a data ingester 1002. Data ingester 1002 is configured to retrieve the data from data sources 102A . . . N. The data can include a plurality of different values for the same property describing the person. In particular, data ingester 1002 repeatedly and continuously monitors a data source to determine whether data relating to any person that is being watched as updated. When data for the person has been updated, data ingester 1002 stores the updated data in database 110. As described above, database 110 stores a running log specifying how persons' data has changed over time.

Using database 110, server 1050 periodically or intermittently generates a machine learning model 1022 to assess the validity of personal data. To generate model 1022, server 1050 includes six modules: querier 1004, data cleaner 1006, data linker 1010, featurizer 1012, trainer 1015, and tester 1020.

API monitor 1003 receives an indication that a value for the particular property in a person's data was verified as accurate or inaccurate at a particular time. For example, a caller may manually verify the accuracy of the value and, after verification, cause an API call to be transmitted to API monitor 1003. Based on the particular time, querier 1004 retrieves, from database 110, the person's data, including values for the plurality of properties, that were up-to-date at the particular time.

Data cleaner 1006 determines whether any of the plurality of different values represent the same attribute. When different values represent the same attribute, data cleaner 1006 determines which of the values determined to represent the same attribute most accurately represents the attribute.

Data linker 1010 links those values determined to represent the same attribute. Data linker 1010 may include a geocoder (not shown) that geocodes each of the plurality of different address values to determine a geographic location, and determines whether any of the determined geographic locations are the same Using the data retrieved by querier 1004, cleaned by data cleaner 1006, and linked by data linker 1010, featurizer 1012 determines a plurality of features. Each of the plurality of features describing a fact about the person's data.

Using the features, trainer 1015 trains model 1022 such that model 1022 can predict whether another person's value for the particular property is accurate. In an embodiment, the trainer trains a plurality of models. Each model utilizing a different type of machine learning algorithm. Tester 1020 evaluates accuracy of the plurality of models using available training data and selects model 1022 from the plurality of models determined based on the evaluated accuracy.

Server 1050 can use model 1022 to forecast whether records in database 110 are accurate. To generate answers presented to a client, server 1050 includes two modules: scoring engine 1025 and answer filter 1030. Scoring engine 1025 applies the model 1022 to predict whether the other person's value in the plurality of properties is accurate. In an embodiment, for respective values in a plurality of values for the particular property of the other person, the model is applied to the respective value to determine a score.

Answer filter 1030 selects at least one value from the plurality of values determined by scoring engine 1025 based on the respective determined scores. In an embodiment, answer filter 1030 filters the answers so that proprietary information is not shared without appropriate consent.

The various modules illustrated in FIG. 10 can conflict with one another and compete inefficiently for computing resources, such as processor power and memory capacity. To deal with these issues, a scheduler is employed to queue the various tasks involved as illustrated in FIG. 11.

Figure 11:
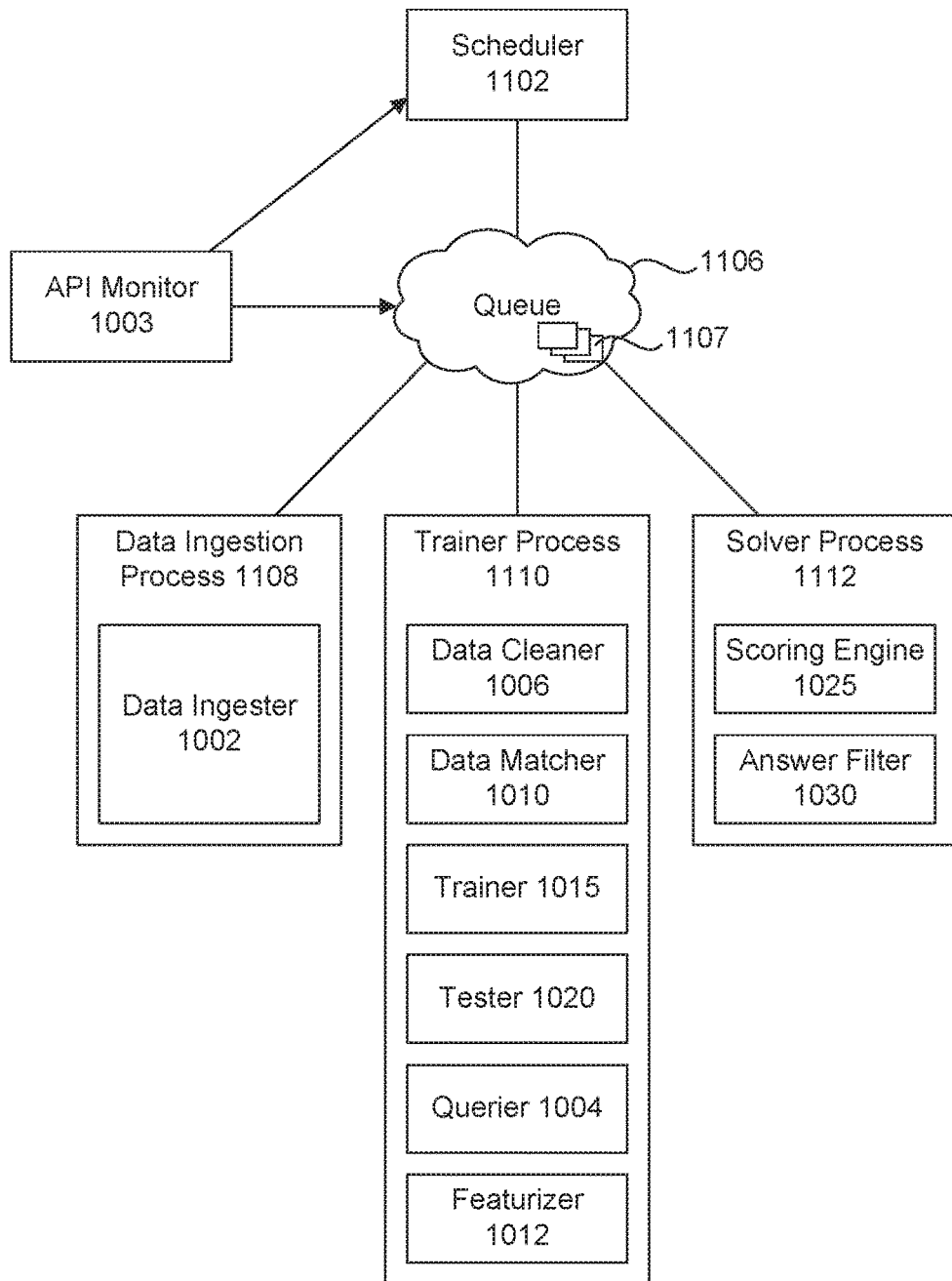
FIG. 11 is a diagram illustrating a system for scheduling ingesting, training, and solving tasks, according to an embodiment.

FIG. 11 is a diagram illustrating a system 1100 for scheduling ingesting, training, and solving tasks, according to an embodiment. In addition to the modules of FIG. 10, system 1100 includes a scheduler 1102 and a queue 1106, and various processes, including a data ingestion process 1108, trainer process 1110, and solver process 1112. Each of the various processes runs on a separate thread of execution.

As in system 1000, system 1100 includes API monitor 1003. As described above, API monitor 1003 can receive an indication that a value for the particular property in a person's data was verified as accurate or inaccurate at a particular time. API monitor 1003 can also receive other types of API requests as well. Depending on the content of an API request, an API monitor can, on receipt of an API request, place a request to complete another job specified on the API request on the queue, the API request including instructions to complete at least one of a data ingestion task, a training task, a solving task, or a scheduling task.

Scheduler 1102 places a request to complete a job on queue 1106. The request including instructions to complete at least one of a data ingestion task, a training task and a solving task. In an embodiment, scheduler 1102 places a request to complete the job on the queue at periodic intervals. Scheduler 1102 also monitors queue 1106. When queue 1106 includes a request to complete the scheduling task (perhaps placed by API monitor 1104), scheduler 1102 schedules a task as specified in the API request.

Queue 1106 queues the various tasks 1107. Queue 1106 may be any type of message queue used for inter-process communication (IPC), or for inter-thread communication within the same process. They use a queue for messaging—the passing of control or of content. Group communication systems provide similar kinds of functionality. Queue 1106 may be implemented, for example, using Java Message Service (JMS) or Amazon Simple Queue Service (SQS).

Data ingestion process 1108 includes data ingester 1002. Data ingestion process 1108 monitors queue 1106 for a data ingestion task. When queue 1106 next includes a data ingestion task, data ingestion process 1108 executes data ingester 1002 to retrieve data relating to a person from a data source and to store the retrieved data in a database.

Trainer process 1110 includes data cleaner 1006, data matcher 1010, trainer 1015, tester 1020, querier 1004, and featurizer 1012. Trainer process 1110 monitors queue 1106 for a training task. When queue 1106 next includes a training task, trainer process 1110 executes data matcher 1010, trainer 1015, tester 1020, querier 1004, and featurizer 1012 to train a model.

Solver process 1112 includes scoring engine 1025 and answer filter 1030. Solver process 1112 monitors queue 1106 for a solving task. When queue 1106 next includes a solving task, solver process 1112 executes scoring engine 1025 and answer filter 1030 apply the model to predict whether the other person's value in the plurality of properties is accurate and to determine a final solution for presentation to a user.

In an embodiment (not shown), system 1100 may include a plurality of queues, each dedicated to one of the data ingestion task, the training task and the solving task. In that embodiment, data ingestion process 1108 monitors a queue dedicated to the data ingestion task. Trainer process 1110 monitors a queue dedicated to the training task. And solver process 1030 monitors a queue dedicated to the solver task.

Each of the servers and modules described above can be implemented in software, firmware, or hardware on a computing device. A computing device can include but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions in a non-transitory manner. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Conclusion

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for scheduling data ingestion and machine learning, comprising:
    a computing device including a processor;
    a database;
    a queue stored on the computing device;
    a scheduler implemented on the computing device and configured to place a request to complete a job on the queue, the request including instructions to complete at least one of a data ingestion task, a training task and a solving task;
    a data ingestion process implemented on the computing device and configured to: (i) monitor the queue and, (ii) when the queue includes a request to complete the data ingestion task, retrieve data relating to a person from a data source and to store the retrieved data in the database;
    a trainer process implemented on the computing device and configured to: (i) monitor the queue and, (ii) when the queue includes a request to complete the training task, train a model using the retrieved data in the database and an indication that a value for a particular property in the retrieved data was verified as accurate or inaccurate such that the model can predict whether another person's value for the particular property is accurate;
    a solver process implemented on the computing device and configured to: (i) monitor the queue and, (ii) when the queue includes a request to complete the solving task, apply the model to predict whether the other person's value is accurate; and
    an API monitor implemented on the computing device and configured to, on receipt of an API request, place a request to complete another job specified on the API request on the queue, the API request including instructions to complete at least one of: the data ingestion task, the training task, the solving task, or a scheduling task.

2. The system of claim 1, further comprising a plurality of queues, each queue dedicated to one of the data ingestion task, the training task and the solving task, wherein the data ingestion process monitors a queue dedicated to the data ingestion task from the plurality of queues, wherein the trainer process monitors a queue dedicated to the training task from the plurality of queues, and wherein the solver process monitors a queue dedicated to the solver task from the plurality of queues.

3. The system of claim 1, wherein the scheduler places the request to complete the job on the queue at periodic intervals.

4. The system of claim 1, wherein the data ingestion process is configured to: (i) monitor the data source to determine whether data relating to the person has updated; and (ii) when data for the person has been updated, storing the updated data in the database.

5. The system of claim 1, wherein the scheduler monitors the queue and, when the queue includes a request to complete the scheduling task, schedules a task as specified in the API request.

6. The system of claim 1, wherein the API request includes: (i) an indication that a value for the particular property in the retrieved data was verified as accurate or inaccurate at a particular time, and (ii) an instruction to complete the training task.

7. The system of claim 1, wherein the data ingestion process is configured to monitor the data source to determine whether data relating to the person has updated and, when data for the person has been updated, place another request to complete the training task on the queue.

8. A computer-implemented method for scheduling data ingestion and machine learning, comprising:
    (a) placing a request to complete a job on a queue, the request including instructions to complete at least one of a data ingestion task, a training task and a solving task;
    (b) monitoring the queue to determine whether the queue includes the request and what task is next on the queue;
    (c) when the queue includes the request to complete the data ingestion task, retrieving data relating to a person from a data source to store the retrieved data in a database;
    (d) when the queue includes the request to complete the training task, training a model using the retrieved data in the database and an indication that a value for a particular property in the retrieved data was verified as accurate or inaccurate such that the model can predict whether another person's value for the particular property is accurate;
    (e) when the queue includes the request to complete the solving task, applying the model to predict whether the other person's value is accurate;

(f) receiving an API request; and
(g) on receipt of the API request, placing another request to complete another job specified on the API request on the queue, the API request including instructions to complete at least one of: the data ingestion task, the training task, the solving task, or a scheduling task.

9. The method of claim 8, wherein the monitoring (b) comprises monitoring a plurality of queues, each dedicated to one of the data ingestion task, the training task and the solving task.

10. The method of claim 8, wherein the placing (a) occurs at periodic intervals.

11. The method of claim 8, further comprising:
(f) monitoring the data source to determine whether data relating to the person has updated; and
(g) when data for the person has been updated, storing the updated data in the database.

12. The method of claim 8, further comprising:
(h) when the queue includes the other request to complete the scheduling task, scheduling a task as specified in the API request.

13. The method of claim 8, wherein the API request includes (i) an indication that a value for the particular property in the retrieved data was verified as accurate or inaccurate at a particular time, and (ii) an instruction to complete the training task.

14. The method of claim 8, further comprising:
(f) monitoring the data source to determine whether data relating to the person has updated; and
(g) when data for the person has been updated, placing another request to complete the training task on the queue.

* * * * *